Patented July 15, 1952

2,603,564

UNITED STATES PATENT OFFICE 2,603,564

LIGHT SENSITIVE DIAZOTYPE LAYER CONTAINING A WHITE OPACIFYING PIGMENT

William J. Maxcy, Easton, Pa., assignor to General Aniline & Film Corporation, New York, N. Y., a corporation of Delaware No Drawing. Application September 21, 1948, Serial No. 50,441

4 Claims. (Cl. 95—6)

This invention relates to improvements in diazotype photoprinting materials, the process of making them, and to copies prepared therewith.

Diazotype photoprinting materials to which the present invention relates are of the two-component type, comprising an azo coupling component and a light-sensitive diazo compound, suitably stabilized against premature coupling, and jointly incorporated in a light-sensitive layer which may be carried on a suitable base or support. Upon exposure of such material to light of locally varied intensity in accordance with an original pattern or design to be reproduced, the light-sensitive diazo compound is partly or completely destroyed or modified in the light-exposed portions so as to render it incapable of coupling with the azo coupling component. By treatment of the exposed layer with a developer adapted to cause coupling of the residual diazo compound with the azo coupling component, particularly an alkaline reagent applied preferably in the form of a vapor, or an alkaline solution, coupling occurs and an azo dye image of the original pattern is formed.

It has been proposed heretofore to employ two-component diazotype layers of the aforesaid type to reproduce subject matter having a substantially continuous range of densities, as found especially in photographs having soft highlights and open shadows, but considerable difficulty was encountered in reproducing such originals because of the high contrast characteristics of most diazotype sensitizing materials.

In general, diazotype sensitizing compositions are essentially water-soluble and are applied in aqueous media to hydrophilic carriers to yield photoprinting material. Copies obtained therewith, however, are sensitive to moisture. To provide more durable copies, it has been proposed to employ a water-insensitive plastic or resinous carrier. In order to sensitize such materials, it is necessary to use a diazotype sensitizing composition which is soluble in an organic solvent suitable for incorporating the composition in the plastic material of the carrier. The resulting limitation of the field of available sensitizing compounds greatly reduces the possibility of obtaining a combination, not only suitable for sensitizing plastic material, but at the same time having moderate gradation characteristics suitable for reproducing photographic subject matter.

It is an object of this invention to provide two-component diazotype photoprinting materials or light-sensitive layers having moderate gradation characteristics suitable for the reproduction of photographic subject matter with open shadows and soft highlights, and at the same time, yielding durable copies which are insensitive to moisture.

More particularly, it is an object of the invention to provide diazotype photoprinting materials or layers of the aforesaid type wherein the sensitizing composition is incorporated in a water-insensitive plastic or resinous film.

I have discovered that the foregoing objects can be attained by providing a light-sensitive layer having a water-insensitive plastic or resin as the binder or vehicle, wherein there is uniformly distributed not only a two-component diazotype sensitizing composition, but in addition a quantity of an inert opacifying light-colored-to-white pigment in a sufficient amount to yield a highly opaque layer, i. e., a layer of high covering power. I have found that despite the use of sensitizing compounds which ordinarily have steep gradation characteristics corresponding to the production of strong contrasts, the inclusion of a pigment of the aforesaid kind moderates the gradation characteristics of the resulting material in said photoprinting, so that faithful reproductions of photographic subject matter can be obtained having open shadows and soft highlights.

Photoprinting materials and layers in accordance with my invention can be advantageously made by preparing a solution of a water-insensitive resin or plastic, and diazotype sensitizing components including an azo coupling component and a light-sensitive diazo compound, suitably stabilized against premature coupling, in a volatile organic solvent in which both the resinous or plastic vehicle or binder and the sensitizing composition are soluble; and further incorporating in the mixture a quantity of an inert light-colored-to-white opacifying pigment, yielding a highly opaque film when the mixture is dry. The mixture can be coated on a support such as paper, metal, glass, plastic or the like, and allowed to dry to form a light-sensitive coating. Similarly, the composition can be converted into a self-sustaining film without the use of another support. Needless to say, the light-sensitive materials are protected from light throughout the processing thereof until their exposure and development.

To produce copies from the resulting diazotype material, the latter is exposed to light of locally varied intensity in accordance with a predetermined pattern, for example, by exposure under an original having a continuous range of densities, and thereupon developing by treatment adapted to effect coupling of the residual diazo compound with the azo coupling component. The developing treatment preferably involves the exposure of the material to alkaline vapor such as ammonia or a volatile nitrogen base, although it can also be carried out by applying a solution of an alkaline-reacting material.

My invention will be more fully understood from the following examples illustrating a preferred embodiment of the invention, wherein percentages are by weight:

*Example I*

An acetone solution of a two-component diazotype sensitizing composition was prepared, having the following composition:

64 cc. acetone
0.34 g. p-diethylaminobenzene-diazonium borofluoride
0.42 g. 2,3-dihydroxy-naphthalene
4.0 g. maleic acid To the resulting solution were added 45 grams of barium sulfate of sufficient fineness to pass a screen having 200 meshes per linear inch. The pigment was thoroughly mixed with the solution. About 153 cc. of a solution made by dissolving 700 grams of cellulose acetate-butyrate (butyryl content: 16%) in 3 liters of acetone, were added to the foregoing solution. (The amount added was sufficient to yield a total liquid volume of 220 cc., exclusive of the barium sulfate.) The resulting mixture was coated on a baryta coated paper, using a doctor blade adjusted to yield a coating having an application thickness of 0.011 inch. The coating was then allowed to dry, yielding a film containing about 58% of barium sulfate. The concentration of the diazo compound in the non-pigment portion of the coating was about 1% and the concentration of the coupling component, about 1.25%. A microscopic examination of the cross-section of the coated paper indicated that the barium sulfate and the diazotype components of the coating were uniformly distributed in the layer of cellulose ester on the surface of the paper, and did not appreciably penetrate below the surface of the paper.

*Example II*

A coating composition was prepared employing the same ingredients and proportions as in Example I, except that 90 grams of barium sulfate were added instead of 45 grams. The resulting composition was applied to the same kind of paper in the same manner as described in the preceding example. After drying, a coating was obtained containing about 73% of barium sulfate.

*Control sample*

The coating composition was prepared in the same manner as in Example I, except that no barium sulfate was added. This composition was applied to a paper base as described in Example I and likewise allowed to dry. The concentration of the diazo compound and azo coupling component in the resulting film was substantially the same as indicated in Example I.

Samples of the paper produced in Examples I and II and a portion of the Control sample were exposed to light under a standard silver step wedge (gamma 1.5, density 3.0), the exposure being adjusted so as to yield a faint shadow of the last visible step of the wedge on each sample after development. The samples were then developed by exposure to ammonia vapor, and the results were compared to determine the number of visible steps of the wedge reproduced on each sample. It was found that the paper of Example II had 12 visible steps, that of Example I had 11 visible steps, while the Control sample had only 9 steps. In the paper prepared according to Examples I and II, the reproduction of the middle tones was greatly improved as compared with the Control sample.

Samples of the paper produced in Examples I and II and a portion of the control sample were exposed to light under a portrait photograph, and the copies were developed by exposure to ammonia. The copies obtained with the paper of Examples I and II yielded excellent reproduction of the details of the original, faithfully rendering soft highlights and open shadows, while the copy obtained with the control sample lacked much of the detail, and had excessive contrast which rendered it unacceptable as a photographic reproduction.

Any inert, moisture-repellent resinous or plastic material yielding transparent moisture-resistant films can be used in preparing the light-sensitive layers of this invention. Thus, organic esters of cellulose, e. g., cellulose acetate, or mixed esters such as cellulose acetate-propionate can be employed. Similarly, cellulose ethers such as ethyl cellulose, can also be used. Many moisture-repellent synthetic resins are likewise suitable, e. g., methyl methacrylate, polyvinyl acetate and its copolymers with polyvinyl chloride, alkyd resins such as glycerine phthalate and other polyvinyl compounds. Suitable solvents include inert volatile organic liquids which will dissolve the resin or plastic material employed as a vehicle or binder, as well as the diazotype sensitizing components to be used. In general, ketones, esters and ethers such as acetone, methyl isobutyl ketone, ethyl or amyl acetate, dioxane, mono- or di-ethyl ether of ethylene glycol, and the like, are suitable, and can be employed either alone or in admixture with each other or with other organic solvents.

Coupling components which are used in preparing the materials of this invention include those commonly employed in diazotype compositions, e. g., resorcinol, phluoroglucinol, 2,3- or 2,7-dihydroxy naphthalene, such azo components containing no sulfonic acid group or other groups which render the materials insoluble in organic solvents. Suitable stabilized light-sensitive diazo compounds employed in the present invention are generally derived from diazo compounds of p-phenylene diamines, wherein one of the amino groups is preferably substituted by at least one alkyl group, e. g., p-amino-N-methyl aniline, p-amino-N-2'hydroxyethyl aniline, p-amino-N-ethyl-N-2'-hydroxyethyl aniline, 4-amino-2-methoxy-N-cyclohexyl aniline, p-amino-N-N-diethyl-m-toluidine, and 3-aminocarbazole. Stabilized forms of these diazo compounds which have adequate solubility in organic solvents of the type described above include, for example, the boro-fluorides, mineral acid-formaldehyde condensation products, and p-aminophenyl sulfonyl derivatives thereof. In order to stabilize the diazotype components against premature coupling, organic acids such as maleic, citric, or tartaric acids can be added, as well as other known compounds, such as thiourea.

The pigments employed are neutral, inert, white or nearly-white materials having good hiding or covering power in the resin or plastic employed as a binder, so as to yield a highly opaque film. Such pigments include, for example, in addition to barium sulfate, calcium sulfate, lead sulfate, lead titanate, and similar materials. The pigment should be sufficiently fine to yield a smooth coating, pigments which pass a 200-mesh screen being suitable as indicated in the examples.

The proportion of pigment in the diazotype layers of this invention is an important factor in obtaining the advantages of the invention. Broadly, an amount sufficient to yield highly opaque coatings of the type disclosed in the examples is sufficient. "Highly opaque" layers, referred to herein and in the appended claims, mean layers having at least the opacity or covering power of a cellulose ester film containing at least 50% by weight (on a dry basis) of barium sulfate of sufficient fineness to pass a 200-mesh screen. In general, an amount of this or other light-colored to white pigments equal to at least 50% by weight of a sensitizing layer will yield the advantages described above, while optimum results are generally obtained when the pigment amounts to 55–75% of dry composition. The maximum amount of pigment is limited by practical considerations, which require adequate cohesion of the composition on drying, and adhesion to a suitable base. Thus, quantities up to 85% can be employed in the case of barium sulfate and similar pigments without excessive loss of cohesion or adhesion. Some shift from the above values for the optimum proportions may occur, depending upon particle size and shape, density, refractive index and chemical nature of the pigments employed, but in general, the values given above apply in the case of a wide variety of inert light-colored-to-white pigments.

The quantity of stabilized diazo compound employed in the sensitizing compositions and in the resulting coating is preferably much less than the amount of plastic or resin binder employed. Thus, as indicated in the examples, a concentration of diazo components of the order of 1% of the non-volatile portion of the composition, exclusive of the pigment, has been found satisfactory. The proportion of diazo compound can be increased to about 10%, but larger amounts are undesirable, since the exposure required to produce clear white highlights is thereby excessively prolonged. Accordingly, an amount of diazo compound from about 0.5 to 5% of the non-volatile portion of the coating composition, exclusive of the pigment is preferred. The proportion of azo coupling component is regulated in accordance with the amount of diazo compound, so that preferably, about 2 to 4 chemical equivalents of coupling component are present per chemical equivalent of diazo compound.

Mixing of the ingredients can be carried out in any convenient manner, adapted to yield uniform distribution of the components of the mixture. The mixing is, of course, carried out in the absence of actinic light. As indicated in the examples, it is convenient to mix the pigments with a solution of the diazotype sensitizing composition in an organic solvent, and to add a solution of the resinous or plastic binder to the resulting solution. When the materials are thoroughly mixed, the resulting mixture can be applied to a suitable base such as paper, glass, metal or plastic, and allowed to dry thereon as a coating, or it can be formed into a self-sustaining film and dried, to yield diazotype photo-printing materials. The diazotype materials are then ready for exposure under a suitable original pattern. After exposure to light under a transparent or translucent original to be reproduced, especially a photographic diapositive, development is carried out preferably by exposure to an alkaline vapor such as ammonia or a volatile organic amine or nitrogen base. Development can also be effected by application to the material of an alkaline solution, e. g. a solution of sodium carbonate, ammonium hydroxide or triethanolamine, to the material.

The resulting copies, particularly of photographic subjects requiring reproduction of a continuous range of densities, are not only superior to those heretofore obtained, but in addition durable copies which are not sensitive to moisture, are produced.

Variations and modifications obvious to those skilled in the art can be made in the process and products of this invention, without departing from the scope thereof.

I claim:

1. Diazotype photoprinting material comprising a supporting base, and a light-sensitive diazotype layer on the surface of the base comprising a moisture-insensitive transparent plastic binder, a diazotype sensitizing composition including an azo coupling component and a light-sensitive diazo compound, stabilized against premature coupling, and a substantially white opacifying pigment in an amount rendering the resulting layer highly opaque, said pigment and said diazotype composition being uniformly distributed in the said binder the amount of said pigment being at least 50% by weight of the layer, and the amount of said light-sensitive diazo compound being not more than 10% by weight of the components of the layer, exclusive of the pigment.

2. A light-sensitive diazotype layer comprising a moisture-insensitive transparent plastic binder, a diazotype sensitizing composition including an azo coupling component and a light-sensitive diazo compound, stabilized against premature coupling, and a substantially white opacifying pigment, said pigment and said diazotype composition being uniformly distributed in the said binder, the amount of pigment being at least 50% by weight of the layer, and the amount of said light-sensitive diazo compound being not more than 10% by weight of the components of the layer, exclusive of the pigment.

3. A light-sensitive diazotype layer comprising a moisture-insensitive transparent plastic binder, a diazotype sensitizing composition including an azo coupling component and a light-sensitive diazo compound, stabilized against premature coupling, and a substantially white opacifying pigment, said pigment and said diazotype composition being uniformly distributed in the said binder, the amount of pigment being 55–75% by weight of the layer, and the amount of said light-sensitive diazo compound being 0.5 to 5% by weight of the components of the layer, exclusive of the pigment.

4. A light-sensitive diazotype layer comprising a film of moisture-insensitive transparent plastic binder, a diazotype sensitizing composition including an azo coupling component, and a light-sensitive diazotized p-phenylene diamine borofluoride, stabilized against premature coupling, and barium sulfate pigment, said diazotype composition and said pigment being uniformly distributed in said binder, said pigment amounting to 55–75% by weight of the layer, and the diazonium borofluoride amounting to 0.5 to 5% by weight of the components of the layer, exclusive of the pigment.

WILLIAM J. MAXCY.

REFERENCES CITED

The following references are of record in the file of this patent:

UNITED STATES PATENTS

| Number | Name | Date |
|---|---|---|
| 314,346 | Roche | Mar. 24, 1885 |
| 1,870,930 | Sprongerts et al. | Aug. 9, 1932 |
| 2,157,206 | Hinman | May 9, 1939 |
| 2,405,523 | Sease | Aug. 6, 1946 |

FOREIGN PATENTS

| Number | Country | Date |
|---|---|---|
| 318,511 | Great Britain | Aug. 7, 1930 |
| 332,552 | Great Britain | July 21, 1930 |
| 361,873 | Great Britain | 1931 |
| 504,283 | Great Britain | Apr. 21, 1939 |